(12) United States Patent
Guney

(10) Patent No.: US 10,878,006 B2
(45) Date of Patent: Dec. 29, 2020

(54) SYSTEMS TO INTERLEAVE SEARCH RESULTS AND RELATED METHODS THEREFOR

(71) Applicant: Wal-Mart Stores, Inc., Bentonville, AR (US)

(72) Inventor: Ergin Guney, San Francisco, CA (US)

(73) Assignee: WALMART APOLLO LLC, Bentonville, AR (US)

( * ) Notice: Subject to any disclaimer, the term of this patent is extended or adjusted under 35 U.S.C. 154(b) by 301 days.

(21) Appl. No.: 15/883,734

(22) Filed: Jan. 30, 2018

(65) Prior Publication Data
US 2019/0236202 A1 Aug. 1, 2019

(51) Int. Cl.
*G06F 17/00* (2019.01)
*G06F 16/332* (2019.01)
*G06F 16/33* (2019.01)
*G06F 16/9535* (2019.01)

(52) U.S. Cl.
CPC ...... *G06F 16/3325* (2019.01); *G06F 16/3334* (2019.01); *G06F 16/9535* (2019.01)

(58) Field of Classification Search
CPC ............ G06F 12/0607; G06F 12/0246; G06F 3/0619; G06F 13/28; G06F 13/4022; G06F 2212/1044
See application file for complete search history.

(56) References Cited

U.S. PATENT DOCUMENTS

2010/0161643 A1  6/2010  Gionis et al.
2012/0150837 A1* 6/2012  Radlinski .............. G06F 16/951
                                                                          707/708

* cited by examiner

*Primary Examiner* — Troung V Vo
(74) *Attorney, Agent, or Firm* — Bryan Cave Leighton Paisner LLP

(57) ABSTRACT

Some embodiments include a system. The system can comprise one or more processors, and one or more non-transitory memory storage devices storing computer instructions configured to run on the one or more processors and perform: receiving a base query string comprising a query parameter; and generating a modified version of the base query string to create a modified query string. The modified query string can comprise the query parameter and an interleaving parameter. Meanwhile, generating the modified version of the base query string to create the modified query string can comprise adding the interleaving parameter to the base query string. Other embodiments of related systems and methods are also provided.

20 Claims, 9 Drawing Sheets

SYSTEMS TO INTERLEAVE SEARCH RESULTS AND RELATED METHODS THEREFOR

FIELD OF THE INVENTION

This disclosure relates generally to systems to interleave search results, and relates more particularly to systems to interleave search results by generating and/or responding to modified query strings and related methods.

DESCRIPTION OF THE BACKGROUND

A/B testing is commonly implemented to test whether a varied process performed by a search engine to generate search results for a search query successfully improves user engagement relative to a controlled process performed by the search engine to generated search results for the search query. Meanwhile, interleaving the search results generated under the varied process and the search results generated under the controlled process can be effective to implement A/B testing. However, conventional approaches for interleaving search results have various limitations. For example, conventional approaches for interleaving search results may involve generating search results from different resources (i.e., different search application programming interfaces having different call points), may introduce undesired variability by repeating less than all activities of the processes performed to generate search results, may have limited capacity for adaptation, may not permit multiple tests to be run in parallel with each other, etc.

BRIEF DESCRIPTION OF THE DRAWINGS

To facilitate further description of the embodiments, the following drawings are provided in which.

Figure 1:
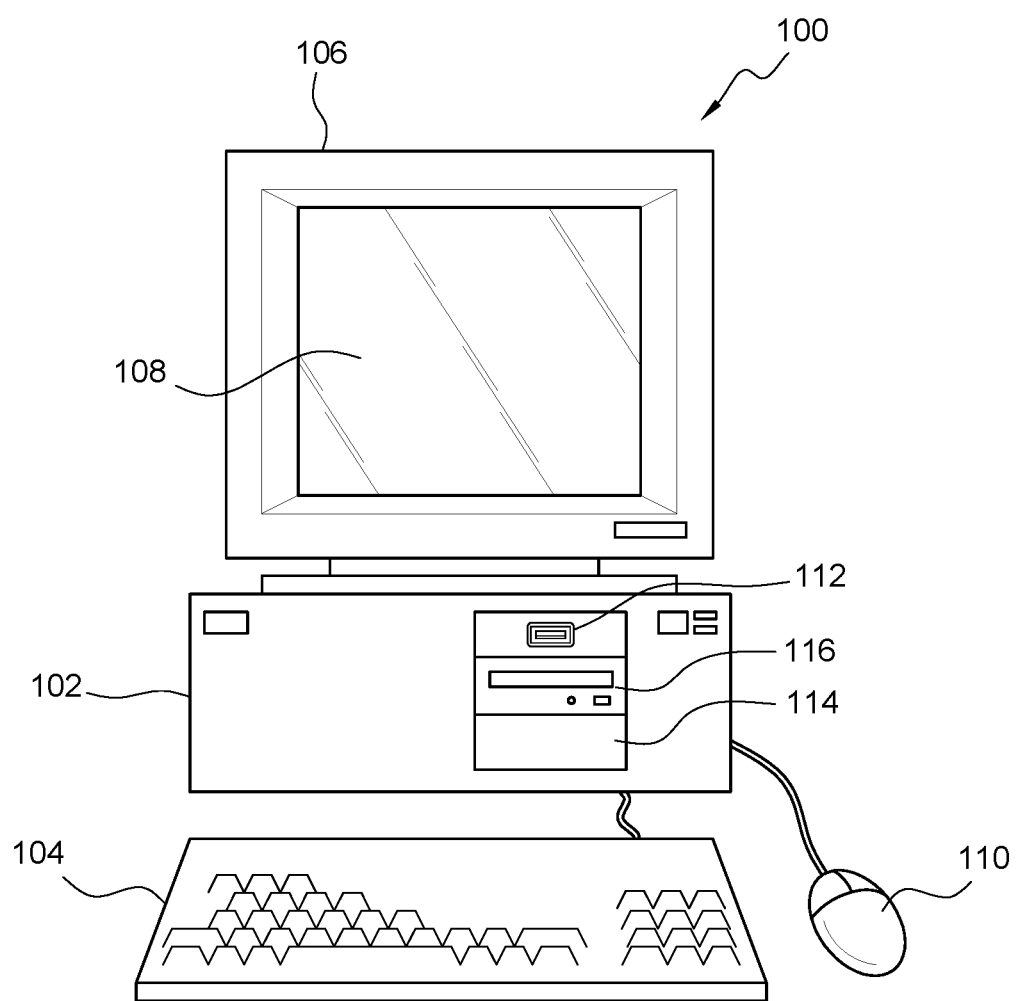
FIG. 1 illustrates a front elevational view of an exemplary computer system that is suitable to implement at least part of a central computer system, at least part of one or more user computer systems, and/or at least part of one or more third party computer systems of the system of FIG. 3, and/or to implement at least part of one or more of the activities of the method of FIG. 8 or one or more other methods described herein.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DETAILED DESCRIPTION OF EXAMPLES OF EMBODIMENTS

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage devices described herein. For example, in some embodiments, all or a portion of computer system 100 can be suitable for implementing part or all of one or more embodiments of the techniques, methods, and/or systems described herein. Furthermore, one or more elements of computer system 100 (e.g., a refreshing monitor 106, a keyboard 104, and/or a mouse 110, etc.) also can be appropriate for implementing part or all of one or more embodiments of the techniques, methods, and/or systems described herein.

In many embodiments, computer system 100 can comprise chassis 102 containing one or more circuit boards (not shown), a Universal Serial Bus (USB) port 112, a hard drive 114, and an optical disc drive 116. Meanwhile, for example, optical disc drive 116 can comprise a Compact Disc Read-Only Memory (CD-ROM), a Digital Video Disc (DVD) drive, or a Blu-ray drive. Still, in other embodiments, a different or separate one of a chassis 102 (and its internal components) can be suitable for implementing part or all of one or more embodiments of the techniques, methods, and/or systems described herein.

Figure 2:
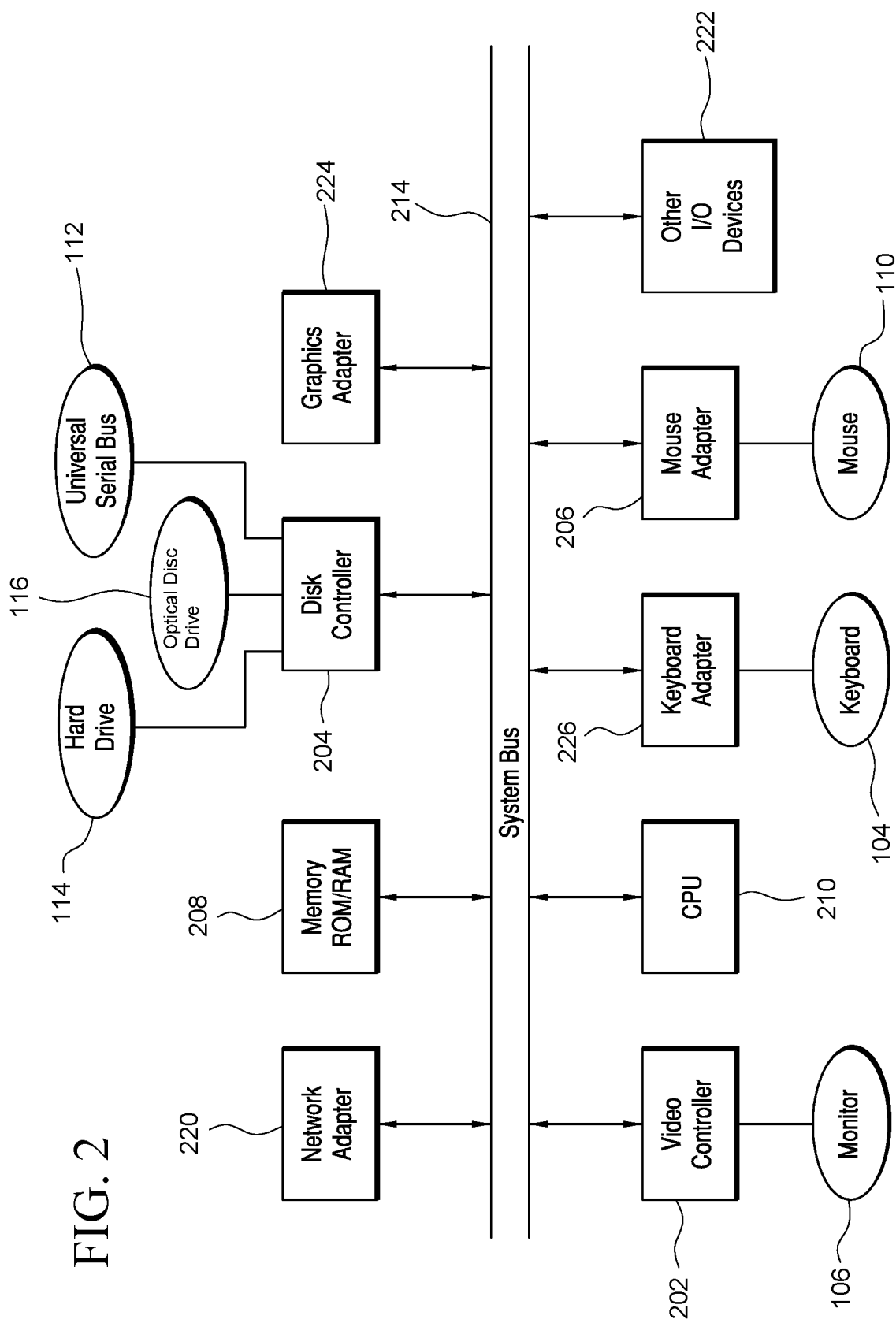
FIG. 2 illustrates a representative block diagram of exemplary elements included on the circuit boards inside a chassis of the computer system of FIG. 1.

Turning ahead in the drawings, FIG. 2 illustrates a representative block diagram of exemplary elements included on the circuit boards inside chassis 102 (FIG. 2). For example, a central processing unit (CPU) 210 is coupled to a system bus 214. In various embodiments, the architecture of CPU 210 can be compliant with any of a variety of commercially distributed architecture families.

In many embodiments, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

The memory storage device(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1 & 2), hard drive 114 (FIGS. 1 & 2), optical disc drive 116 (FIGS. 1 & 2), a floppy disk drive (not shown), etc. As used herein, non-volatile and/or non-transitory memory storage device(s) refer to the portions of the memory storage device(s) that are non-volatile and/or non-transitory memory.

In various examples, portions of the memory storage device(s) of the various embodiments disclosed herein (e.g., portions of the non-volatile memory storage device(s)) can be encoded with a boot code sequence suitable for restoring computer system 100 (FIG. 1) to a functional state after a system reset. In addition, portions of the memory storage device(s) of the various embodiments disclosed herein (e.g., portions of the non-volatile memory storage device(s)) can comprise microcode such as a Basic Input-Output System (BIOS) or Unified Extensible Firmware Interface (UEFI) operable with computer system 100 (FIG. 1). In the same or different examples, portions of the memory storage device(s) of the various embodiments disclosed herein (e.g., portions of the non-volatile memory storage device(s)) can comprise an operating system, which can be a software program that manages the hardware and software resources of a computer and/or a computer network. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Wash., United States of America, (ii) Mac® OS by Apple Inc. of Cupertino, Calif., United States of America, (iii) UNIX® OS, and (iv) Linux® OS. Further exemplary operating systems can comprise (i) iOS™ by Apple Inc. of Cupertino, Calif., United States of America, (ii) the Blackberry® OS by Research In Motion (RIM) of Waterloo, Ontario, Canada, (iii) the Android™ OS developed by the Open Handset Alliance, or (iv) the Windows Mobile™ OS by Microsoft Corp. of Redmond, Wash., United States of America. Further, as used herein, the term "computer network" can refer to a collection of computers and devices interconnected by communications channels that facilitate communications among users and allow users to share resources (e.g., an internet connection, an Ethernet connection, etc.). The computers and devices can be interconnected according to any conventional network topology (e.g., bus, star, tree, linear, ring, mesh, etc.).

As used herein, the term "processor" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1 & 2) and mouse 110 (FIGS. 1 & 2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1 & 2) to display images on a screen 108 (FIG. 1) of computer system 100 (FIG. 1). Disk controller 204 can control hard drive 114 (FIGS. 1 & 2), USB port 112 (FIGS. 1 & 2), and CD-ROM drive 116 (FIGS. 1 & 2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage device(s) of the various embodiments disclosed herein can be executed by CPU 210 (FIG. 2). At least a portion of the program instructions, stored on these devices, can be suitable for carrying out at least part of the techniques, methods, and activities of the methods described herein. In various embodiments, computer system 100 can be reprogrammed with one or more systems, applications, and/or databases to convert computer system 100 from a general purpose computer to a special purpose computer.

Further, although computer system 100 is illustrated as a desktop computer in FIG. 1, in many examples, system 100 can have a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a mobile device. In certain additional embodiments, computer system 100 may comprise an embedded system.

As used herein, the term "mobile device" can refer to a portable electronic device (e.g., an electronic device easily conveyable by hand by a person of average size) with the capability to present audio and/or visual data (e.g., text, images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable computer device, or another portable computer device with the capability to present audio and/or visual data (e.g., text, images, videos, music, etc.).

In many examples, a mobile device can comprise a volume and/or weight sufficiently small as to permit the mobile device to be easily conveyable by hand. For example, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4016 cubic centimeters, and/or 5752 cubic centimeters. Further, in these embodiments, a mobile device can weigh less than or equal to approximately 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPhone®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia®, Surface Pro™, or similar product by the Microsoft Corporation of Redmond, Wash., United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) iOS™ by Apple Inc. of Cupertino, Calif., United States of America, (ii) Blackberry® OS by Research In Motion (RIM) of Waterloo, Ontario, Canada, (iii) Android™ OS developed by the Open Handset Alliance, or (iv) Windows Mobile™ OS by Microsoft Corp. of Redmond, Wash., United States of America.

Figure 3:
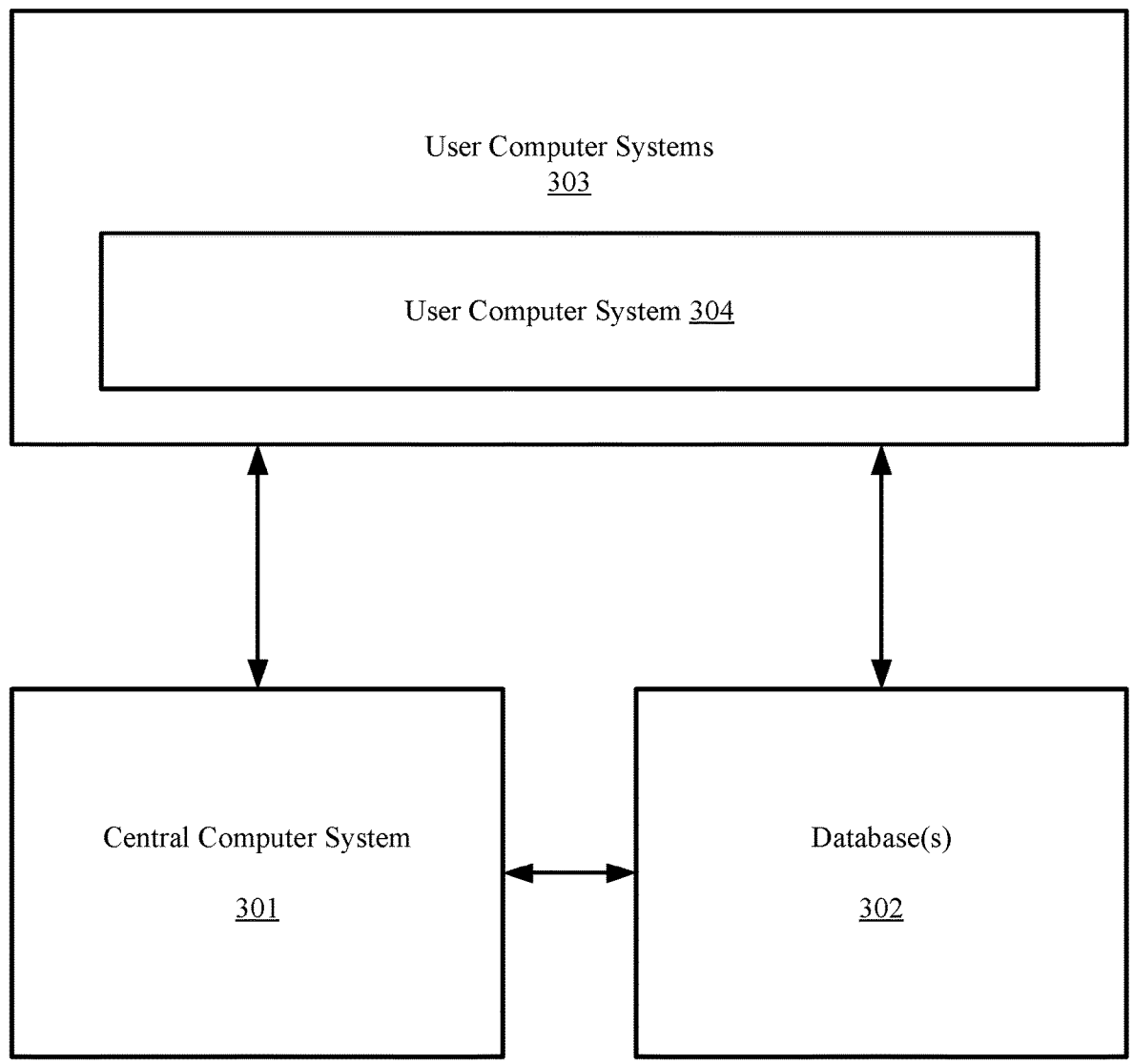
FIG. 3 illustrates a representative block diagram of a system, according to an embodiment.

Skipping ahead now in the drawings, FIG. 3 illustrates a representative block diagram of a system 300, according to an embodiment. In many embodiments, system 300 can comprise a computer system. In some embodiments, system 300 can be implemented to perform part or all of one or more methods (e.g., method 800 (FIG. 8)).

System 300 is merely exemplary and embodiments of the system are not limited to the embodiments presented herein. System 300 can be employed in many different embodiments or examples not specifically depicted or described herein. In some embodiments, certain elements of system 300 can perform various methods and/or activities of those methods. In these or other embodiments, the methods and/or the activities of the methods can be performed by other suitable elements of system 300.

As explained in greater detail below, in many embodiments, system 300 is operable to interleave search results. For example, in some embodiments, system 300 can generate modified query strings in order to interleave search results. In these or other embodiments, system 300 can respond to modified query strings in order to provide interleaved search results.

Accordingly as also explained in greater detail below, in many embodiments, implementing system 300 advantageously can interleave search results that, among other things, permit search results to be generated from a same resource (i.e., a same search application programming interface having a same call point), permit increased accuracy by repeating all activities of the processes performed to generate search results, have capacity for adaptation, and/or permit multiple tests to be run in parallel with each other. Further, implementing system 300 can improve AB testing making use of interleaved search results.

Generally, therefore, system 300 can be implemented with hardware and/or software, as described herein. In some embodiments, at least part of the hardware and/or software can be conventional, while in these or other embodiments, part or all of the hardware and/or software can be customized (e.g., optimized) for implementing part or all of the functionality of system 300 described herein.

Specifically, system 300 can comprise a central computer system 301. In many embodiments, central computer system 301 can be similar or identical to computer system 100 (FIG. 1). Accordingly, central computer system 301 can comprise one or more processors and one or more memory storage devices (e.g., one or more non-transitory memory storage devices). In these or other embodiments, the processor(s) and/or the memory storage device(s) can be similar or identical to the processor(s) and/or memory storage device(s) (e.g., non-transitory memory storage devices) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Further, in these or other embodiments, central computer system 301 can be implemented with a distributed network comprising a distributed memory architecture. The distributed memory architecture can reduce the impact on the distributed network and system resources to reduce congestion in bottlenecks while still allowing data to be accessible from a central location.

Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more output devices (e.g., one or more monitors, one or more touch screen displays, one or more speakers, etc.). Accordingly, the input device(s) can comprise one or more devices configured to receive one or more inputs, and/or the output device(s) can comprise one or more devices configured to provide (e.g., present, display, emit, etc.) one or more outputs. For example, in these or other embodiments, one or more of the input device(s) can be similar or identical to keyboard 104 (FIG. 1) and/or a mouse 110 (FIG. 1). Further, one or more of the output device(s) can be similar or identical to refreshing monitor 106 (FIG. 1) and/or screen 108 (FIG. 1). The input device(s) and the output device(s) can be coupled to the processor(s) and/or the memory storage device(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the output device(s) to the processor(s) and/or the memory storage device(s). In some embodiments, the KVM switch also can be part of central computer system 301. In a similar manner, the processor(s) and the memory storage device(s) can be local and/or remote to each other.

In many embodiments, central computer system 301 is configured to communicate with user computer systems 303 of multiple users. For example, the user(s) can interface (e.g., interact) with central computer system 301, and vice versa, via user computer systems 303.

In these or other embodiments, user computer systems 303 can comprise a user computer system 304. In some embodiments, system 300 can comprise one or more of user computer systems 303.

In many embodiments, central computer system 301 can refer to a back end of system 300 operated by an operator and/or administrator of system 300. In these or other embodiments, the operator and/or administrator of system 300 can manage central computer system 301, the processor(s) of central computer system 301, and/or the memory storage device(s) of central computer system 301 using the input device(s) and/or output device(s) of central computer system 301.

Like central computer system 301, user computer systems 303 each can be similar or identical to computer system 100 (FIG. 1), and in many embodiments, multiple or all of user computer systems 303 can be similar or identical to each other. In many embodiments, user computer systems 303 can comprise one or more desktop computer devices and/or one or more mobile devices, etc. At least part of central computer system 301 can be located remotely from user computer systems 303.

Meanwhile, in many embodiments, for reasons explained later herein, central computer system 301 also can be configured to communicate with one or more databases 302 (e.g., one or more search content databases 501 (FIG. 5), one or more analytics databases 502 (FIG. 5), etc.). Database(s) 302 can be stored on one or more memory storage devices (e.g., non-transitory memory storage device(s)), which can be similar or identical to the one or more memory storage device(s) (e.g., non-transitory memory storage device(s)) described above with respect to computer system 100 (FIG. 1). Also, in some embodiments, for any particular database of database(s) 302, that particular database can be stored on a single memory storage device of the memory storage device(s) and/or the non-transitory memory storage device(s) storing database(s) 302 or it can be spread across multiple of the memory storage device(s) and/or non-transitory memory storage device(s) storing database(s) 302, depending on the size of the particular database and/or the storage capacity of the memory storage device(s) and/or non-transitory memory storage device(s).

In these or other embodiments, the memory storage device(s) of central computer system 301 can comprise some or all of the memory storage device(s) storing database(s) 302. In further embodiments, some of the memory storage device(s) storing database(s) 302 can be part of one or more of user computer systems 303 and/or one or more third-party computer systems (i.e., other than central computer system 301 and/or user computer systems 303), and in still further embodiments, all of the memory storage device(s) storing database(s) 302 can be part of one or more of user computer systems 303 and/or one or more of the third-party computer system(s). Like central computer system 301 and/or user computer systems 303, when applicable, each of the third-party computer system(s) can be similar or identical to computer system 100 (FIG. 1). For simplicity and clarity of illustration, the third-party computer systems are not shown at FIG. 3, and database(s) 302 are illustrated at FIG. 3 apart from central computer system 301 and user computer systems 303 to better illustrate that database(s) 302 can be stored at memory storage device(s) of central computer system 301, user computer systems 303, and/or the third-party computer system(s), depending on the manner in which system 300 is implemented.

Database(s) 302 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database and IBM DB2 Database.

Meanwhile, communication between central computer system 301, user computer systems 303, the third-party computer system(s), and/or database(s) 302 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), Powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCSIS), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
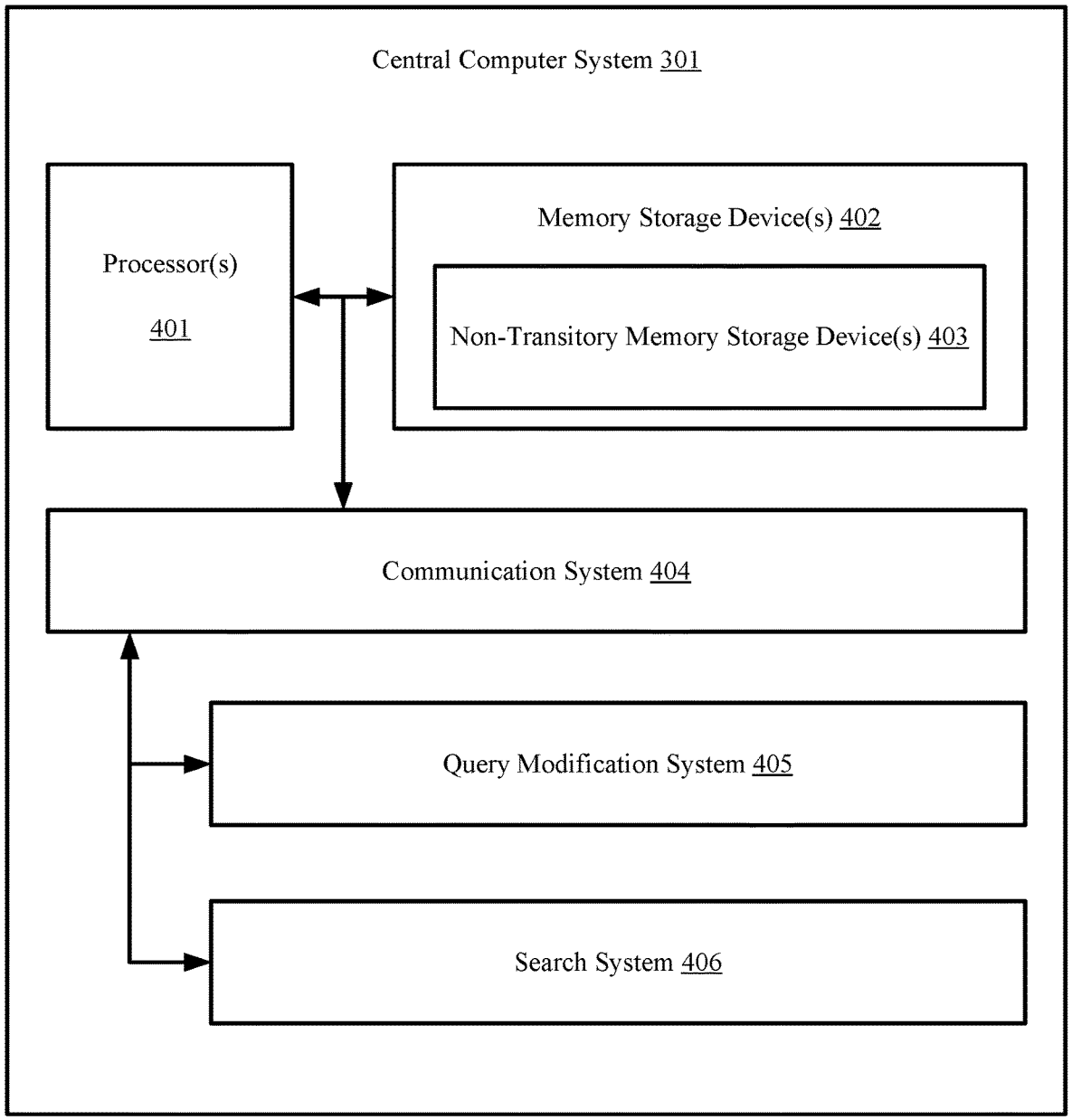
FIG. 4 illustrates a representative block diagram of a central computer system of the system of FIG. 3, according to the embodiment of FIG. 3.
Figure 5:
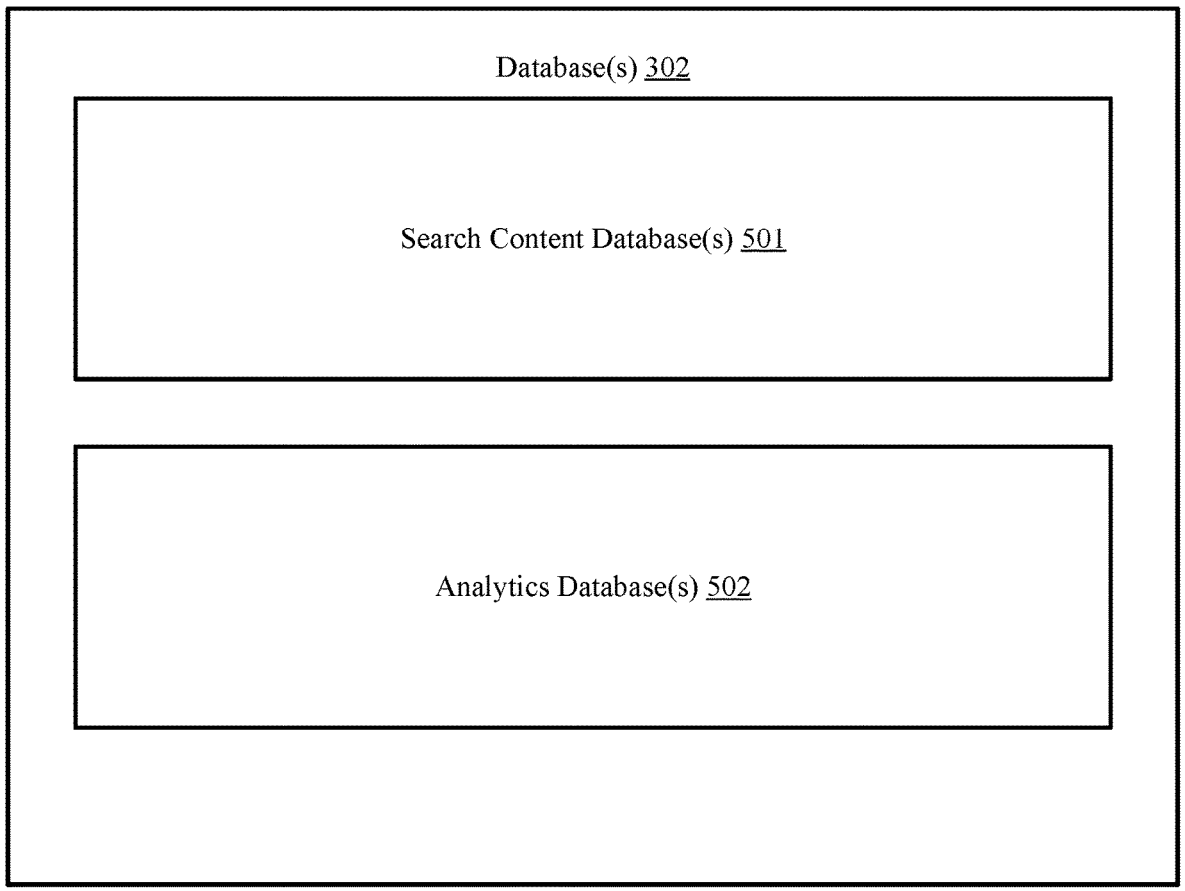
FIG. 5 illustrates a representative block diagram of one or more databases of the system of FIG. 3, according to the embodiment of FIG. 3.

Turning ahead now in the drawings, FIG. 4 illustrates a representative block diagram of central computer system 301, according to the embodiment of FIG. 3, and FIG. 5 illustrates a representative block diagram of database(s) 302, according to the embodiment of FIG. 3.

Referring to FIG. 4, in many embodiments, central computer system 301 can comprise one or more processors 401 and one or more memory storage devices 402. Further, memory storage device(s) 402 can comprise one or more non-transitory memory storage devices 403.

Meanwhile, in these or other embodiments, central computer system 301 comprises a communication system 404, and at least one of a query modification system 405 or a search system 406. As explained in greater detail below, in some embodiments, one of query modification system 405 or search system 406 can be omitted.

In these or other embodiments, part or all of at least one or more of communication system 404, query modification system 405, and/or search system 406 can be part of at least one or more others of communication system 404, query modification system 405, and search system 406, and vice versa.

In many embodiments, processor(s) 401 can be similar or identical to the processor(s) described above with respect to computer system 100 (FIG. 1), and/or central computer system 301 (FIG. 3); memory storage device(s) 402 can be similar or identical to the memory storage device(s) described above with respect to computer system 100 (FIG. 1) and/or central computer system 301 (FIG. 3); and/or non-transitory memory storage device(s) 403 can be similar or identical to the non-transitory memory storage device(s) described above with respect to computer system 100 (FIG. 1) and/or central computer system 301 (FIG. 3). Further, communication system 404, query modification system 405, and search system 406 can be implemented with hardware and/or software, as desirable. Although communication system 404, query modification system 405, and search system 406 are shown at FIG. 4 as being separate from processor(s) 401, memory storage device(s) 402, and/or non-transitory memory storage device(s) 403, in many embodiments, part or all of communication system 404, query modification system 405, and search system 406 can be stored at memory storage device(s) 402 and/or non-transitory memory storage device(s) 403 and can be called and run at processor(s) 401, such as, for example, when the part or all of communication system 404, query modification system 405, and search system 406 are implemented as software.

Communication system 404 can provide and manage communication between the various elements of central computer system 301 (e.g., processor(s) 401, memory storage device(s) 402, non-transitory memory storage device(s) 403, query modification system 405, and search system 406, etc.) and manage incoming and outgoing communications between central computer system 301 (FIG. 3) and user computer systems 303 (FIG. 3), the third party computer system(s), and/or database(s) 302 (FIG. 3). Like the communications between central computer system 301 (FIG. 3), user computer systems 303 (FIG. 3), the third party computer system(s), and/or database(s) 302 (FIG. 3), communication system 404 can be implemented using any suitable manner of wired and/or wireless communication, and/or using any one or any combination of wired and/or wireless communication network topologies and/or protocols, as described above with respect to the central computer system 301 (FIG. 3), user computer systems 303 (FIG. 3), the third party computer system(s), and/or database(s) 302 (FIG. 3). In many embodiments, communication system 404 can be part of hardware and/or software implemented for communications between central computer system 301 (FIG. 3), user computer systems 303 (FIG. 3), the third party computer system(s), and/or database(s) 302 (FIG. 3). For example, as applicable, communication system 404 can permit processor(s) 401 to call (i) software (e.g., at least part of query modification system 405, search system 406, etc.) stored at memory storage device(s) 402 and/or non-transitory memory storage device(s) 403, and/or (ii) data stored at memory storage device(s) 402, at non-transitory memory storage device(s) 403, and/or in database(s) 302 (FIG. 3).

Query modification system 405 can receive a query string, and the query string can be associated with a search query. In many embodiments, a user of user computer system 304 (FIG. 3) can provide the search query associated with the query string to user computer system 304 (FIG. 3), such as, for example, by entering the search query at a graphical user interface of user computer system 304 (FIG. 3), and user computer system 304 (FIG. 3) can provide the query string to central computer system 301 (FIG. 3), whereat the query string can be received by query modification system 405. In many embodiments, the query string received by query modification system 405 can comprise one or more parameters.

In many embodiments, as used herein, a "query string" can refer to instructions that a search engine (e.g., search system 406) can interpret to determine how to process (e.g., parse, pre-process, match, rank, post-process, etc.) a search query associated with the query string. In these or other embodiments, a query string can be part of a uniform resource identifier (URI). In some embodiments, the uniform resource identifier can be a uniform resource locator (URL). In further embodiments, the uniform resource identifier (e.g., uniform resource locator) can comprise a path, and the path can identify a call point for a resource configured to fulfill a search query associated with the query string (i.e., a search application programming interface).

In these or other embodiments, as used herein, a "parameter" of a query string can refer to a data structure (e.g., an attribute-value pair) of the query string. For example, in some embodiments, the parameter or parameters of a query string (e.g., attribute(s) and value(s) paired with the attribute(s)) can embody the instructions that the search engine (e.g., search system 406) can interpret to determine how to process a search query associated with the query string. In many embodiments, when a query string comprises multiple parameters, the parameters can be separated by delimiters, such as, for example, to aid the search engine (e.g., search system 406) in parsing the query string.

Further, query modification system 405 can generate a modified version of the base query string to create a modified query string (i.e., generate a modified query string). For example, in some embodiments, query modification system 405 can generate the modified query string in response to receiving the query string.

In many embodiments, in order to generate the modified query string, query modification system 405 can modify the query string received by query modification system 405. For example, query modification system 405 can add an interleaving parameter to the query string received by query modification system 405. In further embodiments, query modification system 405 also can add one or more experiment parameters to the query string received by query modification system 405. Accordingly, in many embodiments, the modified query string can comprise the one or more parameters of the query string received by query modification system 405 and the interleaving parameter, and in some embodiments, also can comprise one or more experiment parameters. For reference purposes herein, the query string received by the query modification system 405 can be referred to as a base query string, such as, for example, to distinguish the base query string from the modified query string; and the parameter(s) of the base query string can be referred to as query parameter(s), such as, for example, to distinguish the query parameter(s) from the interleaving parameter and the experiment parameter(s).

As explained in greater detail below with respect to search system 406, when active (e.g., true), the interleaving parameter of the modified query string can instruct a search engine (e.g., search system 406) to generate interleaved search results for the search query associated with the base query string. Further, each of the experiment parameter(s) can be associated with a different test parameter that, when the experiment parameter(s) associated therewith is/are active (e.g., true), can be applied by the search engine (e.g., search system 406) to generate the interleaved search results. Meanwhile, in other embodiments, when the modified query string is implemented with the interleaving parameter but not the experiment parameter(s), the test parameter(s) applied by the search engine (e.g., search system 406) to generate the interleaved search results can be directly associated with the interleaving parameter, and the test parameter(s) can be statically determined (e.g., by activating the interleaving parameter) rather than dynamically determined by query modification system 405 (e.g., by activating the interleaving parameter in combination with one or more of the experiment parameters). In many embodiments, the test parameter(s) can apply to any desired activity or activities of the process the search engine (e.g., search system 406) implements to process a search query (e.g., parse, pre-process, match, rank, post-process, etc.). Exemplary pre-process activities can include redirect, spell check, blacklist query enforcement, parameter validation, etc.

In many embodiments, query modification system 405 can determine whether the base query string is associated with a control user or a test user. In order to determine whether the base query string is associated with a control user or a test user, query modification system 405 can determine whether the user of user computer system 304 (FIG. 3) is a control user or a test user, as explained below.

Further, when generating the modified query string, query modification system 405 can determine whether to set the interleaving parameter of the modified query string to be active (e.g., true) based on whether the base query string is determined to be associated with a control user or a test user. For example, in many embodiments, when query modification system 405 determines that the base query string is associated with a control user, query modification system 405 can set the interleaving parameter of the modified query string to be inactive (e.g., false) as part of generating the modified query string. Meanwhile, when query modification system 405 determines that the base query string is associated with a test user, query modification system 405 can set the interleaving parameter of the modified query string to be active (e.g., true) as part of generating the modified query string. Accordingly, in some embodiments, query modification system 405 can limit when a search engine (e.g., search system 406) processes the modified query string to generate interleaved search results to base query strings associated with test users.

Further, in many embodiments, query modification system 405 can designate (e.g., randomly designate) whether a particular user of user computer systems 303 (FIG. 3) is a control user or a test user to establish a control population and a test population among some or all of the users of user computer systems 303 (FIG. 3). In many embodiments, the test population of the users of user computer systems 303 (FIG. 3) can be limited relative to a combined population of the control population and the test population. For example, in some embodiments, the test population of the users of user computer systems 303 (FIG. 3) can represent a particular percentage of the combined population (e.g., approximately 10 percent, approximately 25 percent, approximately 50 percent, approximately 75 percent, approximately 90 percent, etc.). Meanwhile, in these or other embodiments, the combined population can represent a particular percentage of the gross population of all users of user computer system 303 (FIG. 3) (e.g., approximately 2 percent, approximately 5 percent, etc.). In some embodiments, when the modified query string comprises multiple experiment parameters, query modification system 405 can designate same and/or different combined, control, and test populations for two or more experiment parameters. In further embodiments, when the combined population is a sub-set of the gross population of all users of user computer system 303 (FIG. 3), query modification system 405 can determine whether the base query string is associated with a combined user (i.e., is part of the experiment) before determining whether the base query string is associated a control user or a test user.

For example, in some embodiments, query modification system 405 can designate whether a particular user of user computer systems 303 (FIG. 3) is a control user or a test user by assigning (e.g., randomly assigning) a cookie or token indicating that the particular user of user computer systems 303 (FIG. 3) is a control user or a test user. Meanwhile, query modification system 405 can determine whether the base query string is associated with a control user or a test user by reviewing the cookie or token assigned to the user of user computer system 304 (FIG. 3). Nonetheless, in other embodiments, query modification system 405 can implement any other suitable approach for designating and determining whether a particular user of user computer systems 303 (FIG. 3) is a control user or a test user.

In many embodiments, when the modified query string comprises the experiment parameter(s), query modification system 405 can set one or more of the experiment parameter(s) to be active (e.g., true) as part of generating the modified query string. The experiment parameter(s) set to be active (e.g., true) by query modification system 405 can depend on the test parameter(s) associated with the experiment parameter(s) that query modification system 405 determines is/are to be tested. In some embodiments, the experiment parameter(s) set to be active (e.g., true) by query modification system 405 can be manually assigned by the operator of system 300 (FIG. 3). In other embodiments, the experiment parameter(s) set to be active (e.g., true) by query modification system 405 can be automatically assigned according to a programmed algorithm.

In many embodiments, query modification system 405 can set one experiment parameter to be active (e.g., true) at a time, or otherwise implement one test parameter at a time, such as, for example, to more easily/clearly track the effectiveness of particular test parameters and/or to reduce processing loads on processor(s) 401. However, in other embodiments, query modification system 405 can set multiple experiment parameters to be active (e.g., true) at a time, or otherwise implement multiple test parameters at a time.

Search system 406 can receive a modified query string. Further, search system 406 can review the modified query string, such as, for example, to determine how to respond to the modified query string.

In many embodiments, the modified query string can be the modified query string generated by query modification system 405, and search system 406 can receive the modified query string from query modification system 405. However, in some embodiments, such as, for example, when query modification system 405 is omitted from central computer system 301 (FIG. 3), the modified query string can be provided by a third party computer system operated by a third party operator. In these embodiments, the modified query string can be generated by a query modification system of the third party computer system, the query modification system can be similar or identical to query modification system 405, and the third party computer system can be similar or identical to central computer system 301 (FIG. 3).

In other embodiments, search system 406 can be omitted, and query modification system 405 can provide the modified query string generated by query modification system 405 to a search system at a third party computer system operated by a third party operator. In these embodiments, the search system can be similar or identical to search system 406 (FIG. 4), and the third party computer system can be similar or identical to central computer system 301 (FIG. 3).

In many embodiments, in reviewing the modified query string received by search system 406, search system 406 can determine whether the interleaving parameter of the modified query string is active (e.g., true) or inactive (e.g., false). Further, when the modified query string comprises the experiment parameter(s), search system 406 also can determine which, if any, of the experiment parameter(s) are active (e.g., true) as part of reviewing the modified query string received by search system 406.

In many embodiments, when search system 406 determines that the interleaving parameter is inactive (e.g., false), search system 406 can determine search results of the base query string. That is, for example, search system 406 can determine search results according only to the query parameter(s) of the modified query string, thereby determining search results of the base query string. In these embodiments, search system 406 can ignore any experiment parameter(s) of the modified query string that are implemented. In other embodiments, after search system 406 determines that the interleaving parameter is inactive (e.g., false), search system 406 can disregard the modified query string and can determine search research results of the base query string by processing the base query string directly. In some embodiments, search system 406 can determine the search results of the base query string in response to determining that the interleaving parameter is inactive (e.g., false).

In many embodiments, in order to determine the search results of the base query string, search system 406 can evaluate the query parameters (e.g., attribute-value pairs) of the modified query string. Further, search system 406 can retrieve the search results of the base query string from search content database(s) 501 (FIG. 5) in accordance with the query parameter(s) of the modified query string. In many embodiments, search content database(s) 501 (FIG. 5) can comprise any suitable database or databases configured to store search results for search queries. In some embodiments, search content database(s) 501 (FIG. 5) can be updated from time to time, as desired.

Further, when search system 406 determines that the interleaving parameter is inactive (e.g., false), after search system 406 determines the search results of the base query string, search system 406 can provide the search results of the base query string to user computer system 304 (FIG. 3), whereby the search results of the base query string can be provided (e.g., displayed) to the user of user computer system 304 (FIG. 3). In other words, search system 406 can provide the search results of the base query string as an output for the search query associated with the base query string.

Meanwhile, in many embodiments, when search system 406 determines that the interleaving parameter is active (e.g., true), and when only one test parameter is associated with the interleaving parameter or when only one experiment parameter is active (e.g., true), search system 406 can generate interleaved search results in view of the test parameter. For example, search system 406 can (i) generate a first sub-query string comprising the query parameter(s) of the modified query string, (ii) generate a second sub-query string comprising the query parameter(s) of the modified query string and the test parameter, (iii) determine search results of the first sub-query string, (iv) determine search results of the second sub-query string, and (v) generate interleaved search results from the search results of the first sub-query string and from the search results of the second sub-query string, as explained below. In some embodiments, search system 406 can generate the first sub-query string, generate the second sub-query string, determine the search results of the first sub-query string, determine the search results of the second sub-query string, and generate the interleaved search results in response to determining that the interleaving parameter is active (e.g., true).

Meanwhile, after search system 406 determines that the interleaving parameter is active (e.g., true), and when only one test parameter is associated with the interleaving parameter or when only one experiment parameter is active (e.g., true), the modified query string can be disregarded by search system 406 in favor of the first sub-query and the second sub-query generated by search system 406. Also, the first sub-query string and the second sub-query string generated by search system 406 can omit or be devoid of the interleaving parameter and any experiment parameters. In these or other embodiments, search system 406 can treat the first sub-query string and the second sub-query string generated by search system 406 as if the first sub-query and the second sub-query are new original query strings received by search system 406. For example, each of the first sub-query string and the second sub-query string can be fully and separately processed (e.g., parsed, pre-processed, matched, ranked, post-processed, etc.) by search system 406 from scratch as new invocations of search system 406, rather than being processed in part with the modified query string. Meanwhile, because the first sub-query string and the second sub-query string omit or are devoid of the interleaving parameter, the first sub-query string and the second sub-query string can be individually processed without an interleaving analysis by search system 406.

For example, in many embodiments, in order to determine the search results of the first sub-query string, search system 406 can evaluate the query parameters (e.g., attribute-value pairs) of the first sub-query string. Further, search system 406 can retrieve the search results of the first sub-query string from search content database(s) 501 (FIG. 5) in accordance with the query parameter(s) of the first sub-query string. Accordingly, in some embodiments, determining the search results of the first sub-query string can be similar or identical to the search results of the base query string.

Meanwhile, in order to determine the search results of the second sub-query string, search system 406 can evaluate the query parameter(s) (e.g., attribute-value pairs) of the second sub-query string and the test parameter (e.g., attribute-value pair) of the second sub-query string. Further, search system 406 can retrieve the search results of the second sub-query string from search content database(s) 501 (FIG. 5) in accordance with the query parameter(s) and the test parameter of the second sub-query string.

Further, in order to generate the interleaved search results, search system 406 can interleave together the search results of the first sub-query string and the search results of the second sub-query string. In many embodiments, search system 406 can implement any suitable interleaving to interleave together the search results of the first sub-query string and the search results of the second sub-query string. For example, in some embodiments, search system 406 can implement team-draft interleaving or probabilistic interleaving.

By way of illustration, in some embodiments, in order to team-draft interleave together the search results of the first sub-query string and the search results of the second sub-query string, search system 406 can begin by selecting (e.g., randomly selecting) one of the search results of the first sub-query string or the search results of the second sub-query string, and can add the highest listed (e.g., first) search result of the selected one of the search results of the first sub-query string or the search results of the second sub-query string to the interleaved search results. Next, search system 406 can add the highest listed search result of the other one of the search results of the first sub-query string or the search results of the second sub-query string to the interleaved search results that is not already listed among the interleaved search results. Search system 406 can repeat this process, switching back and forth between the search results of the first sub-query string or the search results of the second sub-query string until all of the search results of the first sub-query string or the search results of the second sub-query string are considered, or until the interleaved search results include a predetermined number of search results.

In further embodiments, when search system 406 determines that the interleaving parameter is active (e.g., true), and when multiple test parameters are associated with the interleaving parameter or when multiple experiment parameters are active (e.g., true), search system 406 can generate interleaved search results in view of the multiple test parameters. In these embodiments, search system 406 can generate the interleaved search results in view of the multiple test parameters similarly to how search system 406 generates the interleaved search results in view of the single test parameter. However, in these embodiments, search system 406 can generate additional sub-query strings. For example, search system 406 can generate a first sub-query string comprising the query parameter(s) of the modified query string and other sub-query strings comprising the query parameter(s) of the modified query string and different ones and/or combinations of the multiple test parameters. In many embodiments, the sub-query strings can be similar to the sub-query strings described above in view of the single test parameter, and can be similarly treated and processed by search system 406. In a specific example, when two parameters are being evaluated, search system 406 can generate a first sub-query string comprising the query parameter(s) of the modified query string, and either (i) a second sub-query string comprising the query parameter(s) and a first test parameter of the modified query string and a third sub-query string comprising the query parameter(s) and a second test parameter of the modified query string, such as, for example, when only different ones of the multiple test parameters are evaluated, or (ii) a second sub-query string comprising the query parameter(s) and a first test parameter of the modified query string, a third sub-query string comprising the query parameter(s) and a second test parameter of the modified query string, and a fourth sub-query string comprising the query parameter(s), the first test parameter, and the second test parameter of the modified query string, such as, for example, when different ones and combinations of the multiple test parameters are evaluated. Further, search system 406 can determine search results for the sub-query strings that are generated, and can generate the interleaved search results from the search results of the sub-query strings. As indicated above, in some embodiments, evaluating only one test parameter at a time may be easier and/or more clear to track the effectiveness of particular test parameters and/or may reduce processing loads on processor(s) 401, but it may be desirable to evaluate multiple test parameters simultaneously where robust tracking procedures are implemented and/or where processor(s) 401 can process heavy loads.

Further, after search system 406 generates the interleaved search results, whether in view of one test parameter or multiple test parameters, search system 406 can provide the interleaved search results to user computer system 304 (FIG. 3), whereby the interleaved search results can be provided (e.g., displayed) to the user of user computer system 304

(FIG. 3). In other words, search system 406 can provide the interleaved search results as an output for the search query associated with the base query string.

Meanwhile, search system 406 can log various information related to the interleaved search results. For example, the information relating to the interleaved search results that is collected by search system 406 can be analyzed in conjunction with A/B testing to evaluate the effectiveness of implementing the one or more test parameter(s) on improving engagement of the user of user computer system 304 with the interleaved search results. Exemplary information logged by search system 406 can include a name of the experiment parameter, source search results for each search result of the interleaved search results, rankings of each search result of the interleaved search results, randomization seeds used to implement the interleaving, the sub-query strings contributing to the interleaved search results, the probability of each search result of the interleaved search results (for probabilistic interleaving), etc. In many embodiments, search system 406 can store the information relating to the interleaved search results logged by search system 406 at analytics database(s) 502 from where the information can later be retrieved and reviewed, as desired.

In some embodiments, a cache of central computer system 301 (FIG. 3) can be disabled when search system 406 generates interleaved search results. For example, disabling the cache of central computer system 301 (FIG. 3) can ensure that search system 406 performs all activities of processing the sub-query strings contributing to the interleaved search results for each of the sub-query strings. As a result, A/B testing relying on the interleaved search results can be more accurate because variables in the sub-query strings contributing to the interleaved search results for each of the sub-query strings can be more precisely controlled.

For simplicity and clarity of explanation, the functionality of query modification system 405 and search system 406 generally is described herein as it relates particularly to user computer system 304 (FIG. 3) of user computer system(s) 303 (FIG. 3) and a single modified query string, but in many embodiments, the functionality of query modification system 405 and search system 406 can be extended to multiple ones of user computer systems 303 (FIG. 3) and multiple modified query strings, at the same or at different times.

As indicated above, implementing system 300 (FIG. 3) advantageously can permit search results to be generated from a same resource (i.e., a same search application programming interface having a same call point). For example, by generating and/or responding to a modified query string to interleave search results, system 300 (FIG. 3) can permit calls by a search engine for controlled search results and varied search results to be addressed to a same resource because a path of the uniform resource identifier (e.g., uniform resource locator) including the modified query string can be the same for all query strings and/or sub-query strings processed by a search system (e.g., search system 406). In this manner, implementing system 300 (FIG. 3) can be computationally more efficient because a need to generate search results from multiple different resources (i.e., different search application programming interfaces) can be eliminated.

Further, implementing system 300 (FIG. 3) advantageously can permit increased accuracy of A/B testing relying on interleaved search results because system 300 (FIG. 3) can cause all activities that a search engine (e.g., search system 406) performs to generate search results to be repeated for any sub-query strings generated. As a result, potential sources of error resulting from performing less than all of the activities can be eliminated. This advantage of system 300 (FIG. 3) can be a result of the decision regarding whether to generate interleaved search results being made before any parts of the sub-query strings generated by a search engine (e.g., search system 406) are processed.

Further, implementing system 300 (FIG. 3) advantageously can have capacity for adapting experiments performed. For example, any activities of the process performed by a search engine to generate search results that are controlled by a parameter can be tested. In this manner, implementing system 300 (FIG. 3) can be computationally more efficient because adapting experiments can be as simple as activating a flag rather than writing new code.

Further, implementing system 300 (FIG. 3) can permit multiple tests to be run in parallel with each other, such as, for example, by activating different experiment parameters of a modified query string. For example, by generating and/or responding to a modified query string comprising experiment parameter(s), system 300 (FIG. 3) can quickly and easily evaluate different test parameters without having to rewrite code.

Further, in view of these numerous advantages of system 300 (FIG. 3), implementing system 300 (FIG. 3) can improve A/B testing making use of interleaved search results. For example, implementing system 300 (FIG. 3) can permit A/B testing making use of interleaved search results to be performed with a single resource (e.g., a single search application programming interfacing having one call points) and with increased accuracy. Also, implementing system 300 (FIG. 3) can permit different experiments to be performed in parallel and with minimal effort.

Figure 6:
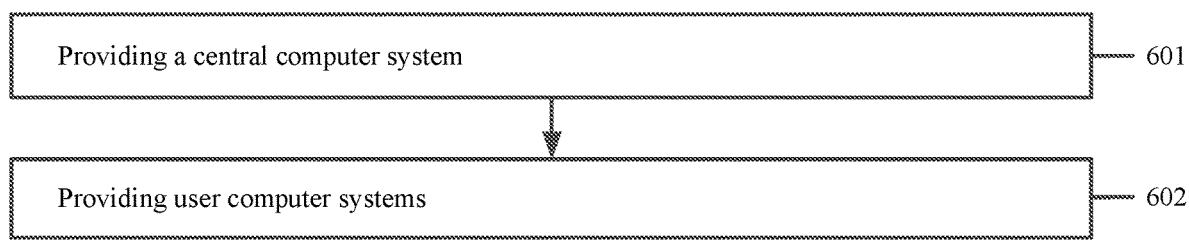
FIG. 6 illustrates a flow chart for a method of providing a system, according to an embodiment.

Turning ahead now in the drawings, FIG. 6 illustrates a flow chart for an embodiment of a method 600 of providing (e.g., manufacturing) a system. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of the method 600 can be performed in any other suitable order. In still other embodiments, one or more of the activities in method 600 can be combined or skipped. In many embodiments, the system can be similar or identical to system 300 (FIG. 3).

Figure 7:
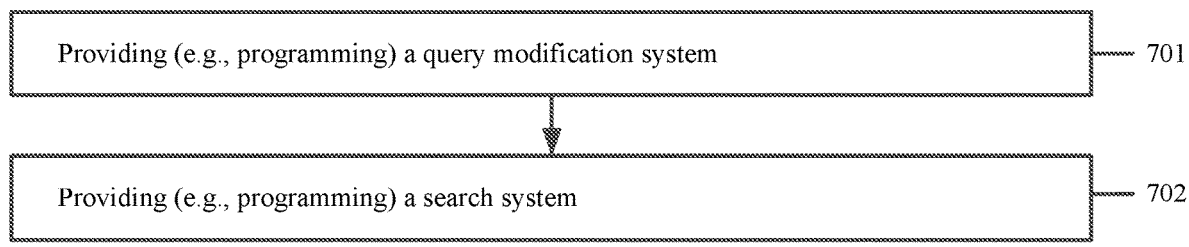
FIG. 7 illustrates a flow chart for an exemplary activity of providing a central computer system, according to the embodiment of FIG. 6.

In many embodiments, method 600 can comprise activity 601 of providing a central computer system. The central computer system can be similar or identical to central computer system 301 (FIG. 3). FIG. 7 illustrates an exemplary activity 601, according to the embodiment of FIG. 6.

For example, in many embodiments, activity 601 can comprise activity 701 of providing (e.g., programming) a query modification system. In some embodiments, the query modification system can be similar or identical to query modification system 405 (FIG. 4).

In many embodiments, activity 601 can comprise activity 702 of providing (e.g., programming) a search system. In some embodiments, the search system can be similar or identical to search system 406 (FIG. 4).

In other embodiments, one of activity 701 or activity 702 can be omitted.

Referring now back to FIG. 6, in some embodiments, method 600 can comprise activity 602 of providing user computer systems. In some embodiments, the user computer systems can be similar or identical to user computer systems 303 (FIG. 3). In other embodiments, activity 602 can be omitted.

Figure 8:
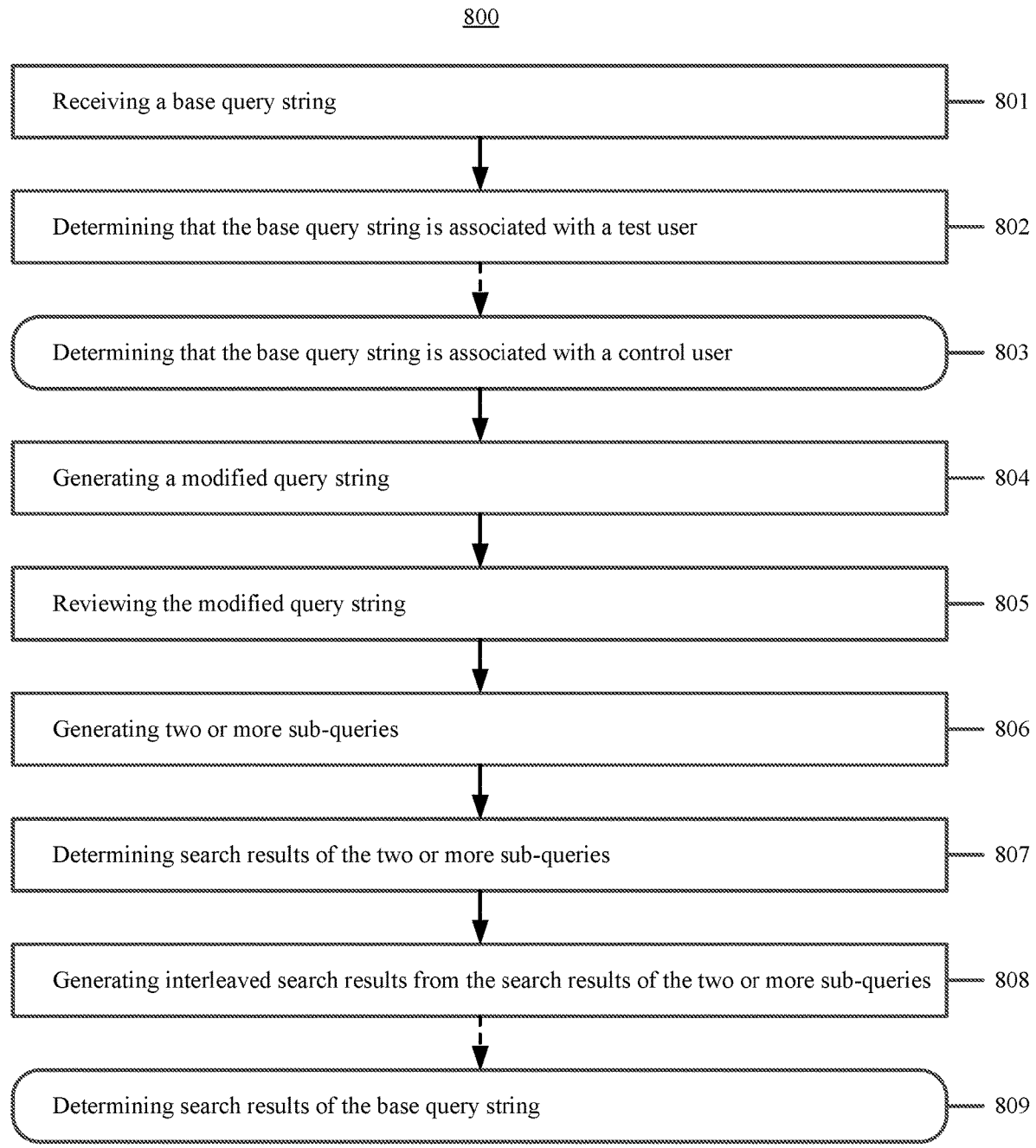
FIG. 8 illustrates a flow chart for an embodiment of a method.

Turning ahead now in the drawings, FIG. 8 illustrates a flow chart for an embodiment of a method 800. Method 800 is merely exemplary and is not limited to the embodiments presented herein. Method 800 can be employed in many different embodiments or examples not specifically depicted or described herein. In some embodiments, the activities of method 800 can be performed in the order presented. In other embodiments, the activities of the method 800 can be performed in any other suitable order. In still other embodiments, one or more of the activities in method 800 can be combined or skipped.

In many embodiments, method 800 can comprise activity 801 of receiving a base query string. In some embodiments, performing activity 801 can be similar or identical to receiving a base query string as described above with respect to system 300 (FIG. 3). Further, the base query string can be similar or identical to the base query string described above with respect to system 300 (FIG. 3).

In many embodiments, method 800 can comprise activity 802 of determining that the base query string is associated with a test user. In some embodiments, performing activity 802 can be similar or identical to determining that the base query string is associated with a test user as described above with respect to system 300 (FIG. 3). Further, the test user can be similar or identical to the test user described above with respect to system 300 (FIG. 3). In some embodiments, activity 802 can be performed after activity 801 is performed and/or in response to activity 801 being performed.

In many embodiments, method 800 can comprise activity 803 of determining that the base query string is associated with a control user. In some embodiments, performing activity 803 can be similar or identical to determining that the base query string is associated with a control user as described above with respect to system 300 (FIG. 3). Further, the control user can be similar or identical to the control user described above with respect to system 300 (FIG. 3). In some embodiments, activity 803 can be performed after activity 801 is performed and/or in response to activity 801 being performed. When activity 802 is performed, activity 803 can be omitted, and vice versa.

Figure 9:
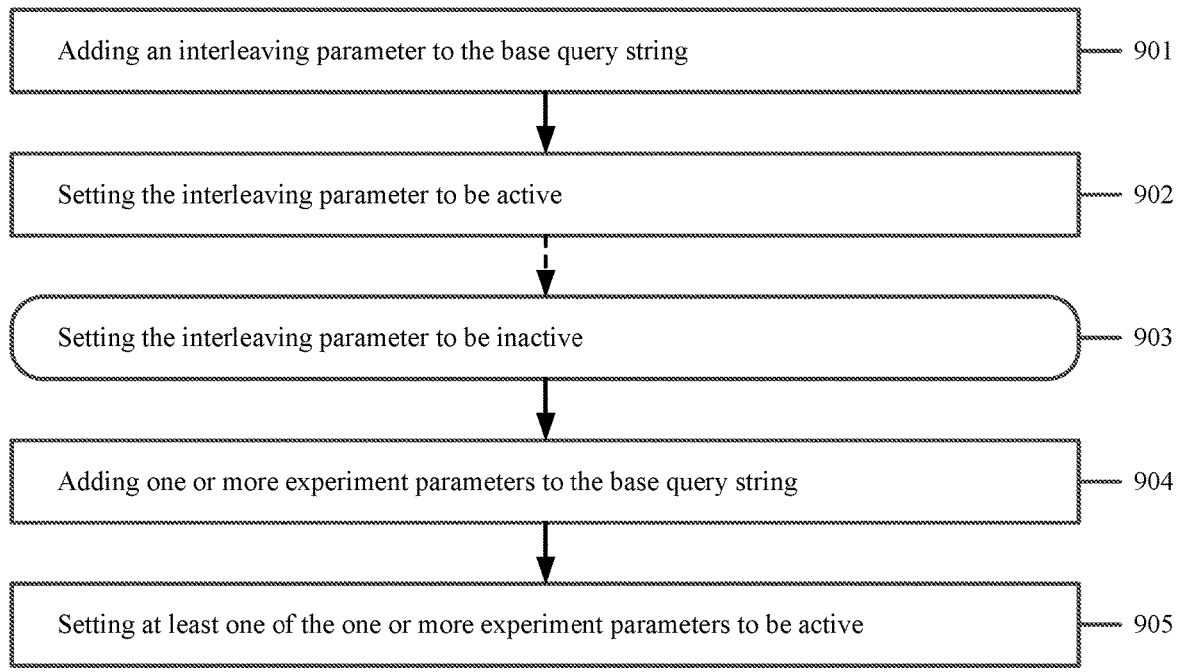
FIG. 9 illustrates a flow chart of an exemplary activity of generating a modified query string, according to the embodiment of FIG. 8.

In many embodiments, method 800 can comprise activity 804 of generating a modified query string. In some embodiments, performing activity 804 can be similar or identical to generating a modified query string as described above with respect to system 300 (FIG. 3). Further, the modified query string can be similar or identical to the modified query string described above with respect to system 300 (FIG. 3). In some embodiments, activity 804 can be performed after one of activity 802 or 803, depending on which of activity 802 or 803 is performed. FIG. 9 illustrates a flow chart of an exemplary activity 804, according to the embodiment of FIG. 8.

For example, in many embodiments, activity 804 in FIG. 9 can comprise activity 901 of adding an interleaving parameter to the base query string. In some embodiments, performing activity 901 can be similar or identical to adding an interleaving parameter to the base query string as described above with respect to system 300 (FIG. 3). Further, the interleaving parameter can be similar or identical to the interleaving parameter described above with respect to system 300 (FIG. 3).

In many embodiments, activity 804 can comprise activity 902 of setting the interleaving parameter to be active. In some embodiments, performing activity 902 can be similar or identical to setting the interleaving parameter to be active as described above with respect to system 300 (FIG. 3). In some embodiments, activity 902 can be performed as part of activity 901. In further embodiments, when activity 803 is performed, activity 902 can be performed.

In many embodiments, activity 804 can comprise activity 903 of setting the interleaving parameter to be inactive. In some embodiments, performing activity 903 can be similar or identical to setting the interleaving parameter to be inactive as described above with respect to system 300 (FIG. 3). In some embodiments, activity 903 can be performed as part of activity 901. In further embodiments, when activity 802 is performed, activity 903 can be performed. When activity 903 is performed, activity 902 can be omitted, and vice versa.

In many embodiments, activity 804 can comprise activity 904 of adding one or more experiment parameters to the base query string. In some embodiments, performing activity 904 can be similar or identical to adding one or more experiment parameters to the base query string as described above with respect to system 300 (FIG. 3). Further, the experiment parameter(s) can be similar or identical to the experiment parameter(s) described above with respect to system 300 (FIG. 3). In some embodiments, activity 904 can be omitted.

In many embodiments, activity 804 can comprise activity 905 of setting at least one of the one or more experiment parameters to be active. In some embodiments, performing activity 905 can be similar or identical to setting at least one of the one or more experiment parameters to be active as described above with respect to system 300 (FIG. 3). In some embodiments, activity 905 can be performed as part of activity 904, or vice versa. In other embodiments, activity 905 can be omitted, such as, for example, when activity 904 is omitted. In some embodiments, when one or more of activity 904 or 905 is performed, activity 904 and/or 905 can be performed after one of activity 902 or 903, depending on which of activity 902 or 903 is performed.

Figure 10:
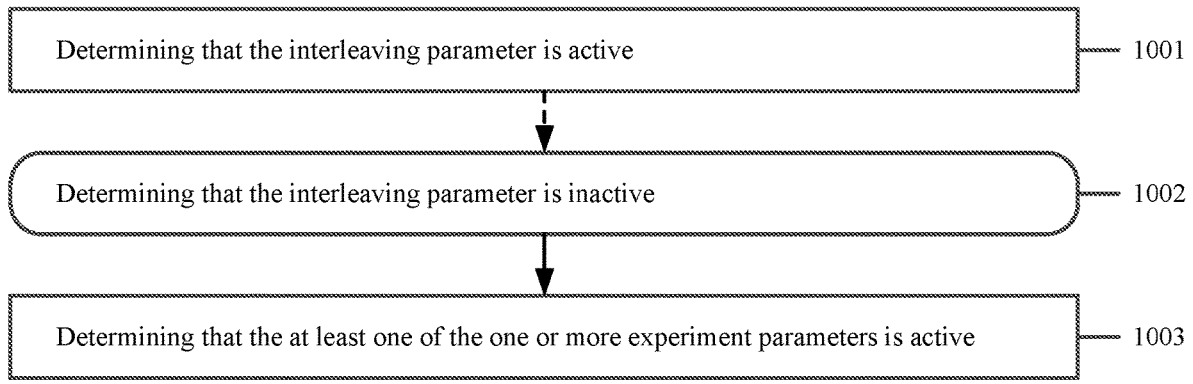
FIG. 10 illustrates a flow chart of an exemplary activity of reviewing the modified query string, according to the embodiment of FIG. 8.

Referring now back to FIG. 8, in many embodiments, method 800 can comprise activity 805 of reviewing the modified query string. In some embodiments, performing activity 805 can be similar or identical to reviewing the modified query string as described above with respect to system 300 (FIG. 3). FIG. 10 illustrates a flow chart of an exemplary activity 805, according to the embodiment of FIG. 8.

For example, in many embodiments, activity 805 in FIG. 10 can comprise activity 1001 of determining that the interleaving parameter is active. In some embodiments, performing activity 1001 can be similar or identical to determining that the interleaving parameter is active as described above with respect to system 300 (FIG. 3).

In many embodiments, activity 805 can comprise activity 1002 of determining that the interleaving parameter is inactive. In some embodiments, performing activity 1002 can be similar or identical to determining that the interleaving parameter is inactive as described above with respect to system 300 (FIG. 3). When activity 1002 is performed, activity 1001 can be omitted, and vice versa.

In many embodiments, activity 805 can comprise activity 1003 of determining that the at least one of the one or more experiment parameters is active. In some embodiments, performing activity 1003 can be similar or identical to determining that the at least one of the one or more experiment parameters is active as described above with respect to system 300 (FIG. 3). In some embodiments, when activity 1001 is performed, activity 1003 can be omitted. In many embodiments, when activity 1002 is performed, activity 1003 can be omitted.

Referring now back to FIG. 8, in many embodiments, method 800 can comprise activity 806 of generating two or more sub-queries. In some embodiments, performing activity 806 can be similar or identical to generating two or more sub-queries as described above with respect to system 300 (FIG. 3). Further, the sub-queries can be similar or identical to the sub-queries described above with respect to system 300 (FIG. 3).

In many embodiments, method 800 can comprise activity 807 of determining search results of the two or more sub-queries. In some embodiments, performing activity 807 can be similar or identical to determining search results of the two or more sub-queries as described above with respect to system 300 (FIG. 3).

Figure 11:
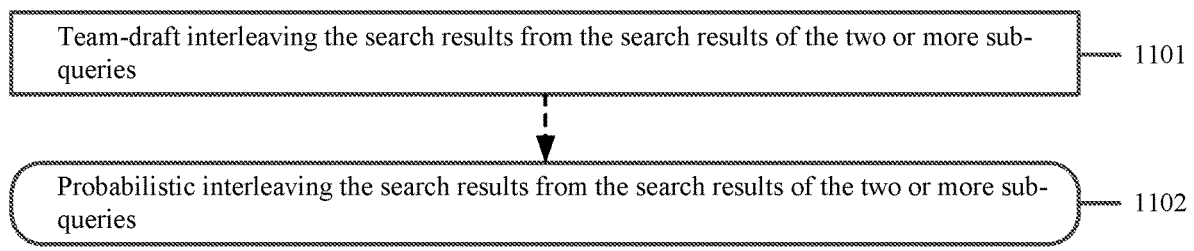
FIG. 11 illustrates a flow chart of an exemplary activity of generating interleaved search results from the search results of the two or more sub-queries, according to the embodiment of FIG. 8.

In many embodiments, method 800 can comprise activity 808 of generating interleaved search results from the search results of the two or more sub-queries. In many embodiments, performing activity 808 can be similar or identical to generating interleaved search results from the search results of the two or more sub-queries as described above with respect to system 300 (FIG. 3). In many embodiments, one or more of activity 806, activity 807, and activity 808 can be performed in response to activity 1001 being performed. FIG. 11 illustrates a flow chart for an exemplary activity 808, according to the embodiment of FIG. 8.

For example, in some embodiments, activity 808 in FIG. 11 can comprise activity 1101 of team-draft interleaving the search results from the search results of the two or more sub-queries. In some embodiments, performing activity 1101 can be similar or identical to team-draft interleaving the search results from the search results of the two or more sub-queries as described above with respect to system 300 (FIG. 3).

In many embodiments, activity 808 can comprise activity 1102 of probabilistic interleaving the search results from the search results of the two or more sub-queries. In some embodiments, performing activity 1102 can be similar or identical to probabilistic interleaving the search results from the search results of the two or more sub-queries as described above with respect to system 300 (FIG. 3). In many embodiments, when activity 1102 is performed, activity 1101 can be omitted, and vice versa.

Referring back again to FIG. 8, in many embodiments, method 800 can comprise activity 809 of determining search results of the base query string. In some embodiments, performing activity 809 can be similar or identical to determining search results of the base query string as described above with respect to system 300 (FIG. 3). In many embodiments, activity 809 can be performed in response to activity 1002 being performed. When activity 809 is performed activities 806-808 can be omitted, and vice versa.

In general, some embodiments include a system. The system can comprise one or more processors, and one or more non-transitory memory storage devices storing computer instructions configured to run on the one or more processors and perform: receiving a base query string comprising a query parameter; and generating a modified version of the base query string to create a modified query string. The modified query string can comprise the query parameter and an interleaving parameter. Meanwhile, generating the modified version of the base query string to create the modified query string can comprise adding the interleaving parameter to the base query string.

Further, some embodiments include a method. The method can be implemented via execution of computer instructions configured to run at one or more processors and configured to be stored at one or more non-transitory memory storage devices, and can comprise: receiving a base query string comprising a query parameter; and generating a modified version of the base query string to create a modified query string. The modified query string can comprise the query parameter and an interleaving parameter. Meanwhile, generating the modified version of the base query string to create the modified query string can comprise adding the interleaving parameter to the base query string.

Further, some embodiments include a system. The system can comprise one or more processors, and one or more non-transitory memory storage devices storing computer instructions configured to run on the one or more processors and perform reviewing a modified query string. The modified query string can comprise a query parameter and an interleaving parameter. Meanwhile, reviewing the modified query string can comprise determining that the interleaving parameter is active. Further, the computer instructions can be configured to perform, responsive to determining that the interleaving parameter is active: generating a first sub-query string comprising the at least one query parameter; generating a second sub-query string comprising the at least one query parameter and a test parameter; determining first search results of the first sub-query string; determining second search results of the second sub-query string; and generating interleaved search results. Meanwhile, generating the interleaved search results can comprise interleaving together the first search results and the second search results for an output for a search query associated with the base query string.

Although the invention has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-11 may be modified, and that the foregoing discussion of certain of these embodiments does not necessarily represent a complete description of all possible embodiments. For example, one or more of the activities of the methods described herein may include different activities and be performed by many different elements, in many different orders. As another example, the elements within central computer system 301 and/or user computer systems 303 in FIG. 3 can be interchanged or otherwise modified.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory memory storage devices storing computer instructions configured to run on the one or more processors and perform:
receiving a base query string comprising a query parameter;
generating a modified version of the base query string to create a modified query string;
determining first search results based on the query parameter; and
determining second search results based on the query parameter, wherein:
the modified query string comprises the query parameter and an interleaving parameter;
generating the modified version of the base query string to create the modified query string comprises:
adding the interleaving parameter to the base query string; and
the first search results and the second search results are:
determined by a same search algorithm; and
at least partially different from each other.

2. The system of claim 1 wherein:
the computer instructions further are configured to perform:
determining that the base query string is associated with a control user; and
when the base query string is determined to be associated with the control user, generating the modified version of the base query string to create the modified query string further comprises:
setting the interleaving parameter to be inactive.

3. The system of claim 1 wherein:
the computer instructions further are configured to perform:
determining that the base query string is associated with a test user; and
when the base query string is determined to be associated with the test user, generating the modified version of the base query string to create the modified query string further comprises:
setting the interleaving parameter to be active.

4. The system of claim 1 wherein:
the computer instructions further are configured to perform:
reviewing the modified query string, wherein reviewing the modified query string comprises:
determining that the interleaving parameter is active; and
responsive to determining that the interleaving parameter is active:
generating a first sub-query string based on the query parameter; and
generating a second sub-query string comprising based on the query parameter and a test parameter;
determining the first search results based on the query parameter comprises:
determining the first search results based on the first sub-query string, which is based on the query parameter; and
determining the second search results based on the query parameter comprises:
determining the second search results based on the second sub-query string, which is based on the query parameter and the test parameter; and
generating interleaved search results, wherein generating the interleaved search results comprises:
interleaving together the first search results and the second search results for an output for a search query associated with the base query string.

5. The system of claim 4 wherein:
interleaving together the first search results and the second search results for the output for the search query associated with the base query string comprises:
team-draft interleaving together the first search results and the second search results for the output for the search query associated with the base query string.

6. The system of claim 4 wherein:
interleaving together the first search results and the second search results for the output for the search query associated with the base query string comprises:
probabilistic interleaving together the first search results and the second search results for the output for the search query associated with the base query string.

7. The system of claim 1 wherein:
the modified query string further comprises an experiment parameter;
the experiment parameter is associated with a test parameter;
generating the modified version of the base query string to create the modified query string further comprises:
adding the experiment parameter to the base query string;
the computer instructions further are configured to perform:
reviewing the modified query string, wherein reviewing the modified query string comprises:
determining that the interleaving parameter is active; and
determining that the experiment parameter is active; and
responsive to determining that the interleaving parameter is active, and responsive to determining that the experiment parameter is active:
generating a first sub-query string based on the query parameter; and
generating a second sub-query string based on the query parameter and the test parameter;
determining the first search results based on the query parameter comprises:
determining the first search results based on the first sub-query string, which is based on the query parameter; and
determining the second search results based on the query parameter comprises:
determining the second search results of the second sub-query string, which is based on the query parameter and the test parameter; and
generating interleaved search results, wherein generating the interleaved search results comprises:
interleaving together the first search results and the second search results for an output for a search query associated with the base query string.

8. The system of claim 1 wherein:
the modified query string further comprises a first experiment parameter and a second experiment parameter;
the first experiment parameter is associated with a first test parameter;

the second experiment parameter is associated with a second test parameter different than the first test parameter;
generating the modified version of the base query string to create the modified query string further comprises:
adding the first experiment parameter to the base query string; and
adding the second experiment parameter to the base query string;
the computer instructions further are configured to perform:
reviewing the modified query string, wherein reviewing the modified query string comprises:
determining that the interleaving parameter is active; and
at least one of:
determining that the first experiment parameter is active; or
determining that the second experiment parameter is active;
when reviewing the modified query string comprises determining that the first experiment parameter is active and does not comprise determining that the second experiment parameter is active, responsive to determining that the interleaving parameter is active, and responsive to determining that the first experiment parameter is active:
generating a first sub-query string based on the query parameter;
generating a second sub-query string based on the query parameter and the first test parameter, wherein:
determining the first search results based on the query parameter comprises:
determining the first search results based on the first sub-query string, which is based on the query parameter; and
determining the second search results based on the query parameter comprises:
determining the second search results based on the second sub-query string, which is based on the query parameter and the first test parameter; and
generating first interleaved search results, wherein generating the first interleaved search results comprises:
interleaving together the first search results and the second search results for an output for a search query associated with the base query string; and
when reviewing the modified query string does not comprise determining that the first experiment parameter is active and does comprise determining that the second experiment parameter is active, responsive to determining that the interleaving parameter is active, and responsive to determining that the second experiment parameter is active:
generating the first sub-query string based on the query parameter;
generating a third sub-query string based on the query parameter and the second test parameter, wherein:
determining the first search results based on the query parameter comprises:
determining the first search results based on the first sub-query string, which is based on the query parameter; and determining the second search results based on the query parameter comprises:
determining third search results based on the third sub-query string, which is based on the query parameter and the second test parameter; and
generating second interleaved search results, wherein generating the second interleaved search results comprises:
interleaving together the first search results and the third search results for the output for the search query associated with the base query string.

9. The system of claim 1, wherein the computer instructions are further configured to perform:
disabling a cache of the system prior to determining the first search results and the second search results.

10. A method, the method being implemented via execution of computer instructions configured to run at one or more processors and configured to be stored at one or more non-transitory memory storage devices, and comprising:
receiving a base query string comprising a query parameter;
generating a modified version of the base query string to create a modified query string;
determining first search results based on the query parameter; and
determining second search results based on the query parameter, wherein:
the modified query string comprises the query parameter and an interleaving parameter;
generating the modified version of the base query string to create the modified query string comprises:
adding the interleaving parameter to the base query string; and
the first search results and the second search results are:
determined by a same search algorithm; and
at least partially different from each other.

11. The method of claim 10 further comprising:
determining that the base query string is associated with a control user;
wherein:
when the base query string is determined to be associated with the control user, generating the modified version of the base query string to create the modified query string further comprises:
setting the interleaving parameter to be inactive.

12. The method of claim 10 further comprising:
determining that the base query string is associated with a test user;
wherein:
when the base query string is determined to be associated with the test user, generating the modified version of the base query string to create the modified query string further comprises:
setting the interleaving parameter to be inactive.

13. The method of claim 10, wherein:
the method further comprises:
reviewing the modified query string, wherein reviewing the modified query string comprises:
determining that the interleaving parameter is active; and
responsive to determining that the interleaving parameter is active:
generating a first sub-query string based on the query parameter; and generating a second sub-query string based on the query parameter and a test parameter;
determining the first search results based on the query parameter comprises:
determining the first search results based on the first sub-query string, which is based on the query parameter;
determining the second search results based on the query parameter comprises:
determining the second search results based on the second sub-query string, which is based on the query parameter and the test parameter; and
generating interleaved search results, wherein generating the interleaved search results comprises:
interleaving together the first search results and the second search results for an output for a search query associated with the base query string.

14. The method of claim 13 wherein:
interleaving together the first search results and the second search results for the output for the search query associated with the base query string comprises:
team-draft interleaving together the first search results and the second search results for the output for the search query associated with the base query string.

15. The method of claim 13 wherein:
interleaving together the first search results and the second search results for the output for the search query associated with the base query string comprises:
probabilistic interleaving together the first search results and the second search results for the output for the search query associated with the base query string.

16. The method of claim 10 wherein:
the modified query string further comprises an experiment parameter;
the experiment parameter is associated with a test parameter;
generating the modified version of the base query string to create the modified query string further comprises:
adding the experiment parameter to the base query string;
the method further comprises:
reviewing the modified query string, wherein reviewing the modified query string comprises:
determining that the interleaving parameter is active; and
determining that the experiment parameter is active; and
responsive to determining that the interleaving parameter is active, and responsive to determining that the experiment parameter is active:
generating a first sub-query string based on the query parameter; and
generating a second sub-query string based on the query parameter and the test parameter;
determining the first search results based on the query parameter comprises:
determining the first search results based on the first sub-query string, which is based on the query parameter; and
determining the second search results based on the query parameter comprises:
determining the second search results of the second sub-query string, which is based on the query parameter and the test parameter; and
generating interleaved search results, wherein generating the interleaved search results comprises:
interleaving together the first search results and the second search results for an output for a search query associated with the base query string.

17. The method of claim 10 wherein:
the modified query string further comprises a first experiment parameter and a second experiment parameter;
the first experiment parameter is associated with a test parameter;
the second experiment parameter is associated with a second test parameter different than the first test parameter;
generating the modified version of the base query string to create the modified query string further comprises:
adding the first experiment parameter to the base query string; and
adding the second experiment parameter to the base query string; and
the method further comprises:
reviewing the modified query string, wherein reviewing the modified query string comprises:
determining that the interleaving parameter is active; and
at least one of:
determining that the first experiment parameter is active; or
determining that the second experiment parameter is active;
when reviewing the modified query string comprises determining that the first experiment parameter is active and does not comprise determining that the second experiment parameter is active, responsive to determining that the interleaving parameter is active, and responsive to determining that the first experiment parameter is active:
generating a first sub-query string based on the query parameter;
generating a second sub-query string based on the query parameter and the first test parameter, wherein:
determining the first search results based on the query parameter comprises:
determining the first search results based on the first sub- query string, which is based on the query parameter; and
determining the second search results based on the query parameter comprises:
determining the second search results based on the second sub-query string, which is based on the query parameter and the first test parameter; and
generating first interleaved search results, wherein generating the first interleaved search results comprises:
interleaving together the first search results and the second search results for an output for a search query associated with the base query string; and
when reviewing the modified query string does not comprise determining that the first experiment parameter is active and does comprise determining that the second experiment parameter is active, responsive to determining that the interleaving parameter is active, and responsive to determining that the second experiment parameter is active:
generating the first sub-query string based on the query parameter;
generating a third sub-query string based on the query parameter and the second test parameter, wherein:
determining the first search results based on the query parameter comprises:

determining the first search results based on the first sub-query string, which is based on the query parameter; and determining the second search results based on the query parameter comprises:

determining third search results based on the third sub-query string, which is based on the query parameter and the second test parameter; and generating second interleaved search results, wherein generating the second interleaved search results comprises:

interleaving together the first search results and the third search results for the output for the search query associated with the base query string.

18. The method of claim 10, wherein the method further comprises:

disabling a cache of a system comprising the one or more processors prior to determining the first search results and the second search results.

19. A system comprising:

one or more processors; and one or more non-transitory memory storage devices storing computer instructions configured to run on the one or more processors and perform:

reviewing a modified query string, the modified query string comprising at least one query parameter and an interleaving parameter, wherein reviewing the modified query string comprises:

determining that the interleaving parameter is active; and responsive to determining that the interleaving parameter is active:

generating a first sub-query string comprising the at least one query parameter;

generating a second sub-query string comprising the at least one query parameter and a test parameter;

determining first search results based on the first sub-query string;

determining second search results based on the second sub-query string; and generating interleaved search results, wherein:

generating the interleaved search results comprises:

interleaving together the first search results and the second search results for an output for a search query associated with the modified query string; and the first search results and the second search results are:

determined by a same search algorithm; and at least partially different from each other.

20. The system of claim 19, wherein the computer instructions are further configured to perform:

disabling a cache of the system prior to determining the first search results and the second search results.

* * * * *